W. L. ANDERSON.
LOCKING DEVICE FOR LOW GEAR ON PLANETARY TRANSMISSION OF AUTOMOBILES.
APPLICATION FILED JULY 12, 1915.
1,174,376.                                              Patented Mar. 7, 1916.
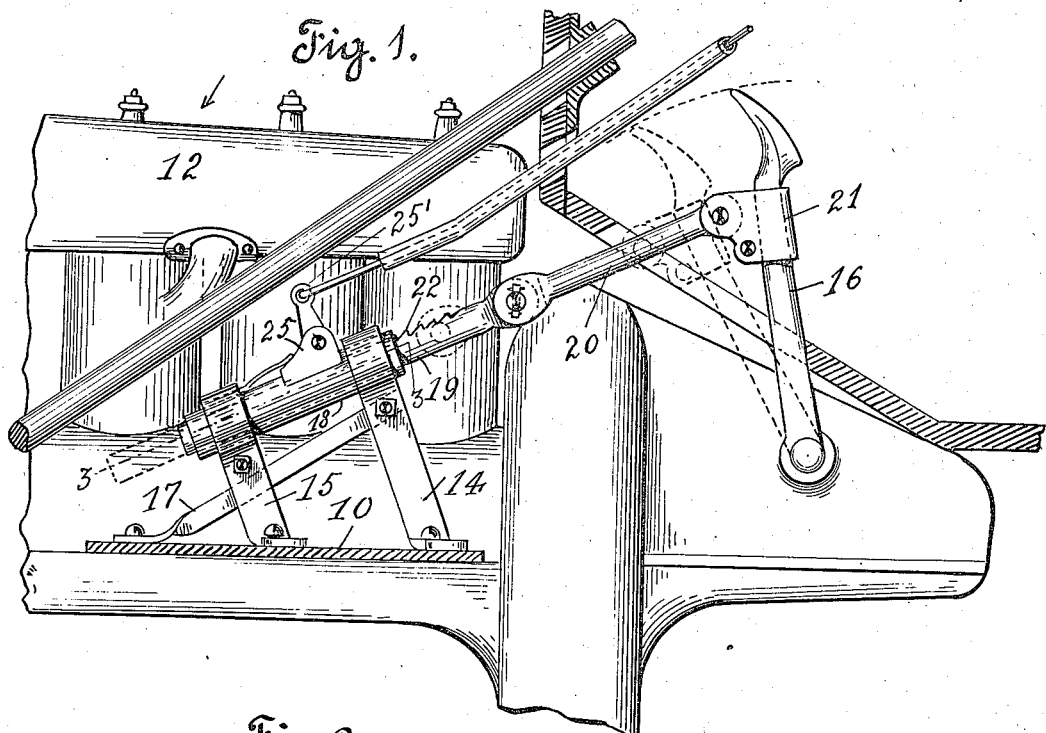
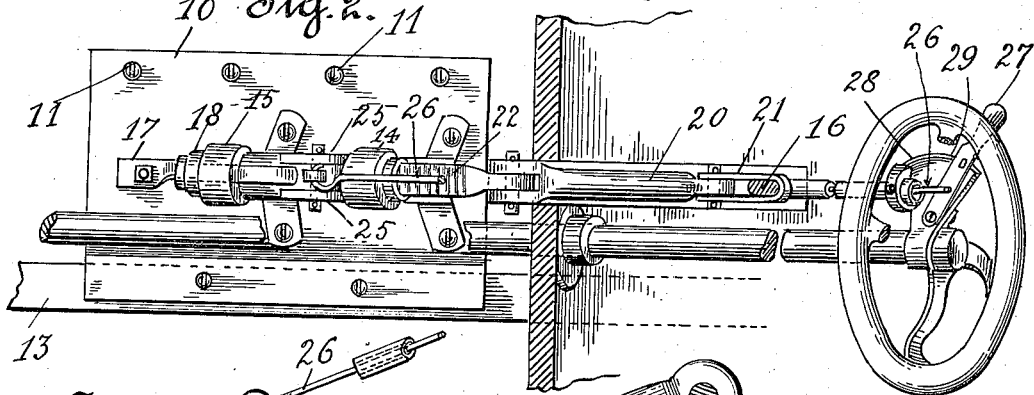
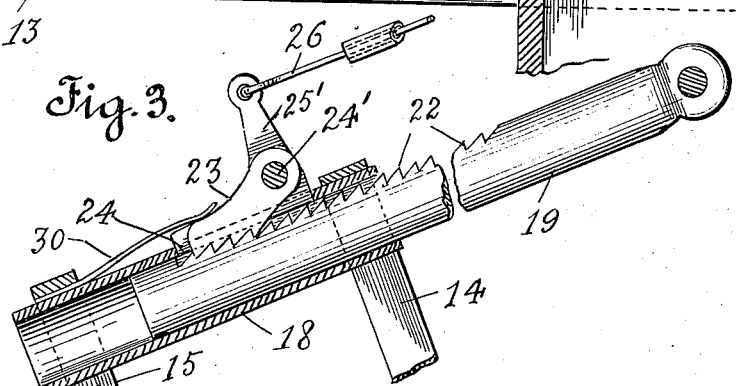
Inventor,
William L. Anderson,
by Hazard Berry and Miller
Attorneys.

UNITED STATES PATENT OFFICE.

WILLIAM LEONARD ANDERSON, OF RIVERSIDE, CALIFORNIA, ASSIGNOR OF ONE-HALF TO FRANK F. PARKER, OF RIVERSIDE, CALIFORNIA.

LOCKING DEVICE FOR LOW GEAR ON PLANETARY TRANSMISSION OF AUTOMOBILES.

1,174,376.  Specification of Letters Patent.  Patented Mar. 7, 1916.

Application filed July 12, 1915. Serial No. 39,271.

*To all whom it may concern:*

Be it known that I, WILLIAM LEONARD ANDERSON, a citizen of the United States, residing at Riverside, in the county of Riverside and State of California, have invented new and useful Improvements in Locking Devices for Low Gear on Planetary Transmission of Automobiles, of which the following is a specification.

My invention relates to an improved locking device for the low gear on a planetary transmission of automobiles.

In automobiles, such as the Ford, having a planetary transmission gear the clutch pedal in front of the driver's seat when pressed forward engages the low speed gear. When half way forward the gears are in neutral (*i. e.* disconnected from the driving mechanism of the rear wheels), and, with a hand lever thrown forward the releasing of this pedal engages the high speed clutch.

The planetary transmission gear being so well known requires no description. It is sufficient to say that a strong spring in the transmission gear pulls backward on the pedal causing the engagement of the high speed clutch.

The low gear is used when the car is first started in motion, or when for any reason the load is so heavy that the use of the low gear is necessary; for instance, when going up a hill. In order to keep the low gear in engagement it is necessary to press forward on the low gear pedal and to keep the same in its forward position in opposition to the action of the spring in the transmission gear above referred to. But holding the foot on the pedal for any length of time when going up a hill of considerable length is fatiguing to the driver. Moreover the low gear transmission band has a tendency to slip and to get hot owing to the occasional release of the low gear pedal.

It is an object of this invention to devise a locking mechanism under the control of the operator whereby the low gear pedal may be instantly locked in position and released therefrom when desired.

My invention consists in the construction and arrangement of parts hereinafter described and claimed.

In the accompanying drawings in which I have illustrated a convenient and practical embodiment of my invention and which form a part of this specification:

Figure 1 shows a side elevation of my locking device mounted on the automobile engine and connected to the low gear pedal. Fig. 2, is a top plan view of the same showing the operative connection from the locking mechanism leading to the steering wheel. Fig. 3, is a detailed view in longitudinal cross section on an enlarged scale taken on line 3—3 Fig. 1.

On a base plate 10 which is securely mounted by screws 11 on the side of automobile engine 12 and the car frame 13 a pair of inclined supporting members 14 and 15 are secured. The angle of inclination is away from the pedal 16, which controls the low gear of the planetary transmission of the automobile (not shown). Each of the supporting members 14 and 15 is constructed of a strip of metal, the lower ends of which are suitably spaced apart for greater strength. At the upper end the metal strip forms a circular eye. The member 14 is of greater height than member 15, their upper ends being in alinement with a collar 21 secured to the upper end of pedal 16. A brace 17 secured to the base plate 10 and to the upper part of member 14 serves to give greater rigidity thereto. Securely mounted in the upper ends of supporting members 14 and 15 is a sleeve 18 preferably circular in cross section. A cylindrical locking bar 19 of a size to fit snugly in sleeve 18 is slidably mounted therein. At the end toward the pedal the locking bar is pivoted to a connecting link 20, which in turn is pivoted at its forward end to the collar 21 securely fastened to the upper part of pedal 16. The upper face of the locking bar is provided with a series of teeth 22 adapted to be engaged by a pawl 23, which projects into said sleeve through a longitudinal slot 24 in the upper side of sleeve 18. Pawl 23 is pivoted to a pin 24′ transversely mounted between a pair of lugs 25, which are preferably formed integral with sleeve 18 and project upwardly on opposite sides of slot 24. Pawl 23 is in the shape of a bell crank lever having an arm 25' integral therewith and projecting upwardly therefrom, and provided at its upper end with an eye engaged by a connecting rod or wire 26 leading along the steering post to the steering wheel. The upper end of wire 26 is attached to a hand lever 27 under the control of the operator. A quadrant 28 fastened to the steering post and provided at its upper edge with a notch 29 is adapted to engage the hand lever 27 and hold the same in position when the wire 26 is moved upwardly thereby disengaging pawl 23 from the teeth of locking bar 19. In order to cause a positive engagement between pawl 23 and locking bar 19 when the pawl is in operative position a leaf spring 30 mounted on sleeve 18 is provided which engages the upper side of pawl 23 holding the latter in operative position with yielding pressure.

From the foregoing description the operation of the locking device will be easily understood.

When it is desired to lock the low gear of the transmission the pedal 16 is pushed forward as usual, the low gear position being indicated in dotted lines in Fig. 1. This movement of the pedal will push link 20 and locking bar downwardly moving locking bar slidably in sleeve 18. The shape of the teeth of the pawl 23 and the locking bar 19 allows them to slide past each other in a downward direction. When the foot is released from the pedal the locking bar 19 is automatically locked by pawl 23, which prevents any upward movement of said bar. When it is desired to unlock said bar, and to allow the pedal to drop back into high speed, pawl 23 is disengaged from the locking bar by operating hand lever 27 and moving the same into notch 29 whereby through wire 26 and arm 25 pawl 23 is lifted against the spring 30. When it is desired to restore the locking device to operative position all that is necessary is to move the hand lever out of notch 29 when spring 30 pressing on pawl 23 will move the same into operative position.

I claim:

1. In a locking device for the low gear on a planetary transmission gear of an automobile, the combination of a low gear controlling clutch pedal, a base plate adapted to be secured to the side of an automobile engine, a pair of supports having their upper ends in alinement with said pedal, a sleeve secured to the upper ends of said supports, said sleeve being provided with a longitudinal slot on its upper face and having a pair of ears extending upwardly on opposite sides of said slot, a pawl extending into said slot and comprising a bell crank lever fulcrumed between said ears, a locking bar slidably mounted in said sleeve, said bar being provided with teeth adapted to lock with said pawl when said pedal is moved toward low gear releasing position, a link pivotally connecting said bar to said pedal, a spring holding said pawl in operative engagement with said bar, and a connection under the control of the driver for moving said pawl out of operative position.

2. In a locking device for the low gear on a planetary transmission gear of an automobile, a combination of a low gear controlling clutch pedal, a pair of supports having their upper ends in alinement with said pedal, a sleeve mounted thereon, said sleeve having a longitudinal slot, a pawl extending into said slot, a locking bar slidably mounted in said sleeve, said bar being provided with pawl engaging elements adapted to lock with said pawl when said pedal is moved toward low gear releasing position, a link pivotally connecting said bar to said pedal, yielding means holding said pawl in operative engagement with said bar, means under the control of the driver for moving said pawl out of operative position.

3. In a locking device for the low gear on a planetary transmission gear of an automobile, a combination of a support, a sleeve mounted on the upper end thereof, the ends of said sleeve being in substantial alinement with said pedal, said sleeve being provided with a slot, a pawl extending into said slot, a locking bar operatively connected to said pedal and slidably mounted in said sleeve and provided with pawl engaging elements adapted to lock with said pawl when said pedal is moved in a direction toward low gear releasing position, means for holding said pawl in operative engagement with said bar, and means under the control of the driver for moving said pawl out of operative position.

4. In a locking device for the low gear on a planetary transmission gear of an automobile, the combination of a low gear controlling clutch pedal, a supporting member, a locking bar provided with teeth slidably supported thereon and operatively connected to the upper end of said pedal, a pawl adapted to lock said bar in position when said pedal is moved in a direction toward low gear releasing position, resilient means pressing said pawl into operative engagement with said teeth, and a manually controlled connection leading from said pawl to the upper end of the steering post for moving said pawl out of engagement with said teeth, against the tension of said resilient means.

5. In a locking device for the low gear on a planetary transmission of an automobile, the combination of a low gear controlling clutch pedal, a supporting member, a locking bar provided with teeth slidably supported thereon and operatively connected to the upper end of said pedal, a pawl engaging said teeth and adapted to lock said bar when said pedal is moved in a direction toward low gear releasing position, resilient means tending to press said pawl in operative engagement with said teeth, and manually controlled means acting against the tension of said resilient means for rendering said pawl inoperative.

In testimony whereof I have signed my name to this specification.

WILLIAM LEONARD ANDERSON.